(12) United States Patent
Martin

(10) Patent No.: US 9,928,603 B2
(45) Date of Patent: Mar. 27, 2018

(54) DETECTING FACIAL LIVELINESS

(71) Applicant: MorphoTrust USA, LLC, Billerica, MA (US)

(72) Inventor: Brian Martin, McMurray, PA (US)

(73) Assignee: MorphoTrust USA, LLC, Billerica, MA (US)

( * ) Notice: Subject to any disclaimer, the term of this patent is extended or adjusted under 35 U.S.C. 154(b) by 0 days.

(21) Appl. No.: 14/985,889

(22) Filed: Dec. 31, 2015

(65) Prior Publication Data

US 2016/0188958 A1    Jun. 30, 2016

Related U.S. Application Data

(60) Provisional application No. 62/098,596, filed on Dec. 31, 2014.

(51) Int. Cl.
*G06K 9/00* (2006.01)
*G06T 7/20* (2017.01)
*G06K 9/22* (2006.01)

(52) U.S. Cl.
CPC .............. *G06T 7/20* (2013.01); *G06K 9/0061* (2013.01); *G06K 9/00228* (2013.01); *G06K 9/00906* (2013.01); *G06K 9/00979* (2013.01); *G06K 9/228* (2013.01); *G06K 9/00335* (2013.01); *G06K 2009/00953* (2013.01)

(58) Field of Classification Search
None
See application file for complete search history.

(56) References Cited

U.S. PATENT DOCUMENTS

| 7,801,335 | B2 * | 9/2010 | Hanna ................ G06K 9/00604 |
| | | | 382/115 |
| 8,260,008 | B2 * | 9/2012 | Hanna ................ G06K 9/00604 |
| | | | 382/100 |
| 8,280,120 | B2 | 10/2012 | Hoyos et al. |
| 8,364,971 | B2 * | 1/2013 | Bell ....................... G06F 21/32 |
| | | | 382/117 |
| 8,457,367 | B1 | 6/2013 | Sipe et al. |

(Continued)

FOREIGN PATENT DOCUMENTS

WO    WO2005/008566    1/2005

OTHER PUBLICATIONS

International Search Report and Written Opinion for Application No. PCT/US2015/068357, dated Mar. 18, 2016, 13 pages.

(Continued)

*Primary Examiner* — Soo Park
(74) *Attorney, Agent, or Firm* — Fish & Richardson P.C.

(57) ABSTRACT

Methods, systems, and computer-readable storage mediums for detecting facial liveliness are provided. Implementations include actions of processing first and second facial images of a subject to determine first and second corneal reflections of an object, the first and second facial images being captured at first and second sequential time points, determining a corneal reflection change of the object based on the determined first and second corneal reflections, comparing the determined corneal reflection change of the object to a motion associated with the first and second time points, and determining facial liveliness of the subject based on a result of the comparison.

20 Claims, 6 Drawing Sheets

(56) References Cited

U.S. PATENT DOCUMENTS

| | | | |
|---|---|---|---|
| 8,798,330 B2* | 8/2014 | Hanna | G06K 9/00604 |
| | | | 382/115 |
| 8,818,051 B2 | 8/2014 | Hoyos et al. | |
| 8,818,052 B2 | 8/2014 | Hoyos et al. | |
| 9,003,196 B2* | 4/2015 | Hoyos | H04L 63/10 |
| | | | 713/186 |
| 9,008,375 B2 | 4/2015 | Malhas et al. | |
| 9,058,519 B2* | 6/2015 | Law | G06K 9/00899 |
| 9,313,200 B2* | 4/2016 | Hoyos | H04L 63/0861 |
| 9,355,299 B2 | 5/2016 | Hoyos et al. | |
| 9,613,281 B2 | 4/2017 | Hanna et al. | |
| 2006/0279726 A1 | 12/2006 | Galambos | |
| 2007/0019862 A1 | 1/2007 | Kakiuchi | |
| 2007/0110285 A1 | 5/2007 | Hanna et al. | |
| 2010/0299530 A1* | 11/2010 | Bell | G06F 21/32 |
| | | | 713/186 |
| 2011/0007949 A1* | 1/2011 | Hanna | G06K 9/00604 |
| | | | 382/107 |
| 2013/0212655 A1* | 8/2013 | Hoyos | G06K 9/00107 |
| | | | 726/5 |
| 2014/0044321 A1 | 2/2014 | Derakhshani et al. | |
| 2014/0169642 A1 | 6/2014 | Law | |
| 2014/0196143 A1 | 7/2014 | Fliderman | |
| 2014/0307929 A1 | 10/2014 | Nechyba et al. | |
| 2016/0019420 A1 | 1/2016 | Feng et al. | |
| 2016/0019421 A1 | 1/2016 | Feng et al. | |
| 2016/0026862 A1* | 1/2016 | Anderson | H04N 5/23229 |
| | | | 382/117 |
| 2016/0057138 A1* | 2/2016 | Hoyos | G06T 7/73 |
| | | | 726/7 |
| 2016/0117544 A1 | 4/2016 | Hoyos et al. | |
| 2016/0125178 A1* | 5/2016 | Danikhno | G06F 21/32 |
| | | | 726/18 |
| 2017/0103276 A1 | 4/2017 | Rauhala et al. | |
| 2017/0206413 A1 | 7/2017 | Hanna et al. | |

OTHER PUBLICATIONS

International Preliminary Report on Patentability for International Application No. PCT/US2015/068357, dated Jul. 13, 2017, 12 pages.

* cited by examiner

DETECTING FACIAL LIVELINESS

CROSS-REFERENCE TO RELATED APPLICATION

This application claims priority under 35 USC § 119(e) to U.S. Provisional Patent Application Ser. No. 62/098,596, filed on Dec. 31, 2014, the entire contents of which is hereby incorporated by reference.

FIELD

This disclosure generally relates to computer-based authentication.

BACKGROUND

Transactions between a consumer and a merchant may be subject to risks of identity theft, identity fraud, spoofing, phishing, etc., all of which may potentially hinder the flow of commerce.

SUMMARY

Implementations of the present disclosure include computer-implemented methods for detecting facial liveliness. In some implementations, methods include actions of processing first and second facial images of a subject to determine first and second corneal reflections of an object, the first and second facial images being captured at first and second sequential time points; determining a corneal reflection change of the object based on the determined first and second corneal reflections; comparing the determined corneal reflection change of the object to a motion associated with the first and second time points; and determining facial liveliness of the subject based on a result of the comparison.

These and other implementations can each optionally include one or more of the following features: comparing the determined corneal reflection change of the object to a motion includes correlating the determined corneal reflection change of the object to the motion; scoring a matching quality based on a result of the correlation; and comparing the scored matching quality to a predetermined threshold. Determining facial liveliness of the subject includes determining that the face of the subject is live in response to determining that the scored matching quality is beyond the predetermined threshold. The actions further includes determining an expected corneal reflection of the object at the second time point based on the determined first corneal reflection and the motion; and assessing the facial liveliness of the subject by determining likelihood between the expected corneal reflection and the determined second corneal reflection.

In some implementations, the corneal reflection change of the object includes a position change of the corneal refection of the object. The motion can be associated with a movement of the object between first and second positions, and the first facial image can be captured at the first time point when the object is at the first position and the second facial image can be captured at the second time point when the object is at the second position. The actions can further include receiving information of the movement of the object measured by a sensor; and determining the motion based on the received information of the movement of the object. In some cases, the actions include prompting the subject to move the object. In some cases, the movement of the object is associated with a natural motion of the subject.

The actions are executed by one or more processors that can be included in a computing device. The computing device can include the object and the sensor, and the object can be a camera device and the sensor can include at least one of an accelerometer, a gyroscope, or a global positioning system (GPS). The actions can further include determining, by using the sensor, that the object is moving; and requesting the camera device to capture facial images of the subject.

In some examples, the motion is a predetermined motion for the object, and the object is moved from the first position to the second position based on the predetermined motion. In some examples, the first and second facial images include a second object that is static during the movement of the object, and the actions further include determining the motion based on a position change of the second object in the first and second facial images.

The actions can include transmitting a command to a controller coupled to the object, the command indicating the controller to move the object. The command can include a predetermined motion for the object, and wherein the predetermined motion is different from a previous predetermined motion for the object.

In some implementations, the actions include transmitting a command to a camera device to capture facial images of the subject at sequential time points including the first and second time points; and receiving the captured facial images from the camera device. Receiving the captured facial images from the camera device can include receiving a video stream feed from the camera device, the video stream feed comprising the captured facial images. In some examples, the camera device is moved from a first position to a second position between the first and second time points. The first facial image of the subject is captured at the first time point when the camera device is at the first position, and the second facial image of the subject is captured at the second time point when the camera device is at the second position, and the motion is based on a movement of the camera device between the first and second positions. In some examples, the actions include transmitting a second command to a controller coupled to the object, the second command indicating the controller to move the object at the first and second time points, and the motion is based on the movement of the camera device and the movement of the object.

The object can include one of a camera device, an illumination device, or an object brighter than ambient environment. The corneal reflection change of the object can include a first illumination change on the object in the first and second corneal reflections. In some cases, the actions further include obtaining a second illumination change on the object for the first and second time points; and determining a matching quality between the obtained second illumination change on the object and the first illumination change in the first and second corneal reflections. Determining facial liveliness of the subject can include determining the facial liveliness of the subject based on the determined matching quality and the result of the comparison.

The actions can include determining that the subject chooses to use liveliness verification for biometric authentication. The actions can also include transmitting, to a computing device at an identity provider, an authentication request of the subject for accessing an account managed by a relying party different from the identity provider, the authentication request including biometric data of the subject and the determined facial liveliness of the subject.

Another implementations of the present disclosure include computer-implemented methods for detecting facial liveliness that include actions of processing first and second facial images of a subject to determine first and second poses of a face of the subject, the first and second facial images being captured at first and second sequential time points; determining a change in pose of the face based on the determined first and second poses; comparing the determined change in pose of the face to a motion associated with the first and second time points; and determining facial liveliness of the subject based on a result of the comparison.

These and other implementations can each optionally include one or more of the following features: comparing the determined change in pose of the face to a motion includes correlating the determined change in pose of the face to the motion; scoring a matching quality based on a result of the correlation; and comparing the scored matching quality to a predetermined threshold. Determining facial liveliness of the subject includes determining that the face of the subject is live in response to determining that the scored matching quality is beyond the predetermined threshold. Determining first and second poses of the face can include determining at least one facial landmark of the face.

In some examples, the actions include calculating a pose of the face at the second time point based on the determined first pose and the motion; and assessing facial liveliness by determining likelihood between the calculated pose of the face to the determined second pose of the face from the second facial image.

The motion can be associated with a relative movement between the face and a camera device configured to capture facial images of the subject. In some examples, the actions include prompting the subject to move the camera device relative to the face of the subject. In some examples, the actions include receiving information of the movement of the camera device measured by a sensor; and determining the motion based on the received information of the movement of the camera device.

The actions are executed by one or more processors that can be included in a computing device, and the computing device can include the camera device and the sensor, and the sensor includes at least one of an accelerometer, a gyroscope, or a global positioning system (GPS).

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Proof of identity may present a perennial challenge in our daily transactions. With the advent of the Internet, comes the age of e-commerce in which on-line transactions may replace in-person transactions. However, the sheer volume and complexity of these on-line transactions may give rise to a digital world fraught with peril, including, for example, identity theft, identity fraud, spoofing, phishing, etc. Notably, such risks may not be new in the Internet age, although the Internet may have amplified such risks. As the society moves towards cloud computing, more and more databases may become accessible. Identity data in some databases may be more reliable and robust than others, based on history or tradition. As connectivity becomes ubiquitous and as more identity databases become available on accessible platforms, identity-related data housed therein can be accessed to increase the confidence in the quality of transactions conducted either online and in person. In addition, biometric data submitted on-line can be verified for liveliness to deter spoofing attempts. In some implementations, the liveliness verification can be leverage analysis of real-time corneal reflection and/or real-time face pose to increase confidence in the biometric data being submitted on-line for authentication. Implementations disclosed herein may be extended to enterprise entities other than financial institutions. This application is directed to systems and methods to detect liveliness of a facial representation during, for example, an on-line session between two parties over a network. Note that the terms "liveliness" and "liveness" can be used interchangeably here.

Figure 1A:
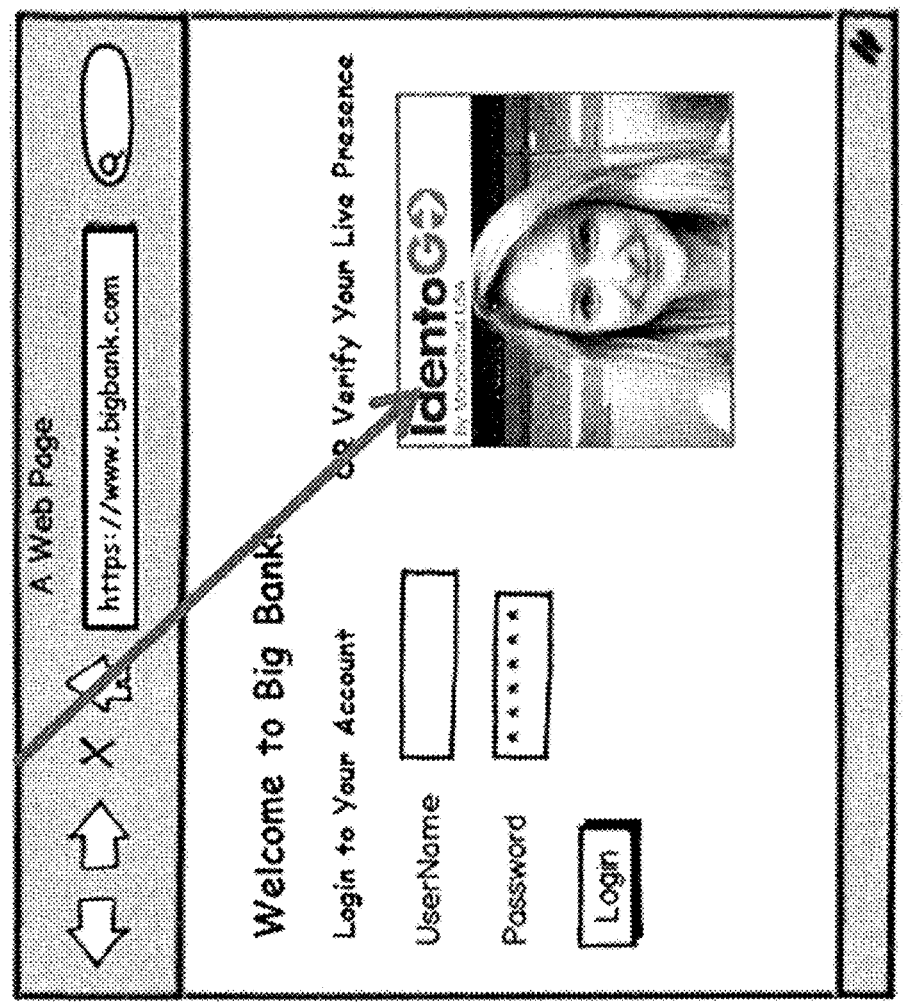
FIG. 1A is a diagram showing an example web site capable of authenticating a user based on a biometric identity of the user according to some implementations.

FIG. 1A is a diagram showing an example web site capable of authenticating a user based on a biometric identity of the user according to some implementations. As illustrated, a user name and password may be required for logging into an account administered by the server hosting the web-site. For example, the server may run an implementation of a hypertext transmission protocol secure (https). In the Internet age, a consumer user may have accounts at dozens of more web-sites, each with disparate requirements of user names and passwords. The consumer user may have a hard time keeping track of user names and passwords at each of the web-sites. Losing track of the registered username or password can hinder on-line access convenience. The consumer user may store the usernames and passwords for each account at a central file. But, access to the central file may be breached, leading to comprises in the stored usernames and passwords. In fact, simple on-line identities including user name and password may be subject to identity theft and identity fraud. A recent survey revealed that identity theft in the United States rose to a three-year high in 2012, with more than 5 percent of the adult population, or 12.6 million people, falling victim to such crimes. The numbers are up from 4.9 percent in 2011 and 4.35 percent in 2010. The incidence of identity theft is only expected to rise. To mitigate the risks arising from identity theft in the context of e-commerce, some implementations, as disclosed herein may choose to authenticate biometric data presented the user on-line. Such biometric data may include, but are not limited to, facial pattern, finger print, palm print, retina scan, iris scan, DNA pattern, voice characteristics, gait analysis. Generally speaking, such biometric data submitted on-line may be in a digital form to facilitate electronic verification.

As illustrated by FIG. 1A, biometric login window 102 may be provided by a third-party, different from, for example, the entity that runs bigbank.com. The login window 102 may present the captured facial biometric of the user as the user attempts to log in based on the user's biometric. When the user's biometric data is transmitted for on-line authentication, the biometric data may be encrypted in accordance with industry standard including, for example, data encryption standard (DES), triple-DES, advanced encryption standard (AES), Rivest-Shamir-Adlema (RSA), open pretty good privacy (PGP), etc. In some implementations, the encryptions may be performed on a session-by-session basis in which the session encryption and decryption keys are constantly updated or refreshed to thwart attacks.

Figure 1B:
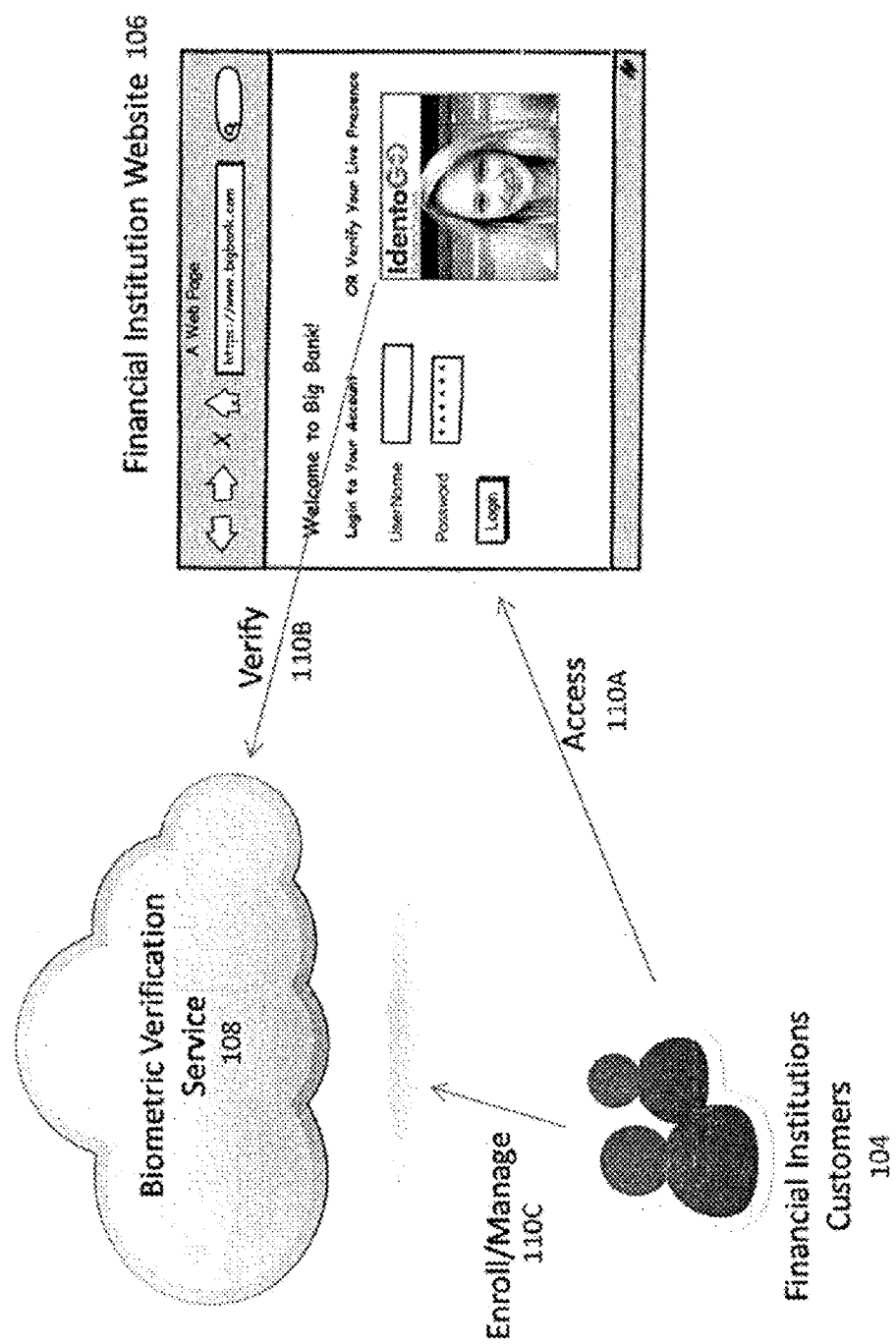
FIG. 1B is a diagram showing an example interaction among a financial institution customer, a financial institution, and a third-party biometric verification service to authenticate a user based on a biometric identity of the user according to some implementations.

At least two issues still remain. The first issue is regarding the vetting process in which a user may register a biometric of the user at a trusted server, for example, a third party server. The second issue is regarding the authentication process in which the liveliness of a biometric presented on-line can be verified to thwart spoofing attempts (for example, someone using a video or photo of the registered user to pretend to be the registered user), or man-in-the-middle attacks. To these ends, FIG. 1B is a diagram showing an example interaction among a financial institution customer, a financial institution, and a third-party biometric verification service to authenticate a user based on a biometric identity of the user according to some implementations. As disclosed herein, the financial institution may include a bank, and may also be known as the relying party. The third-party service provider may also be known as the identity provider.

When a financial institution customer 104 attempts to access an account through the financial institution website 106 (110A), customer 104 may be greeted with the biometric authentication window 102. The financial institution customer 104 may choose to use the biometric authentication. In response to receiving indication from customer 104 that the customer 104 would like to use the biometric authentication 102, the server running the financial institution website 106 may verify the user's authentication request using biometric data at biometric verification service 108 (110B). In some implementations, if customer 104 has never registered a biometric data at the biometric verification service 108, biometric verification service 108 may engage customer 104 to have the customer enrolled (110C). The enrollment process may generally include asking customer 104 to provide a biometric data as the biometric identity data stored/managed by biometric verification service 108. The enrollment process may become part of the vetting process in which biometric verification service further verifies the identity of the customer 104 at other authorities, including, for example, Department of Motor Vehicles (DMV) at the state level and the State Department at the federal level. The authorities may include a credit verification agency, such as, for example, Equifax, Experian, LexisNexis. The credit verification agency may serve as a surrogate of a government-administered authority. After the customer 104 obtains an enrolled biometric identity at the biometric verification service, customer 104 may interact with biometric verification service 108 to conduct routine management of the biometric identity (110C). Routine management may include, for example, replacement of a facial pattern, revocation of an existing facial pattern, etc. Hence, the first issue of a vetting process to register an enrolled biometric data of customer 104 may be addressed.

Regarding the second issue of the liveliness of the biometric data being presented on-line, the biometric login window 102 may authenticate customer 104 by analyzing real-time corneal reflection of an object (e.g., a camera device or an illumination source) and/or analyzing real-time face pose from customer 104. As discussed herein, a financial institution may be generalized as a relying party (RP) who may rely on a third party to authenticate that a customer is who the customer purports to be and that the customer is presenting a live facial biometric. The third party, known as the biometric verification service 108 in FIG. 1B, may be generalized as an identity provider (IdP).

Figure 2A:
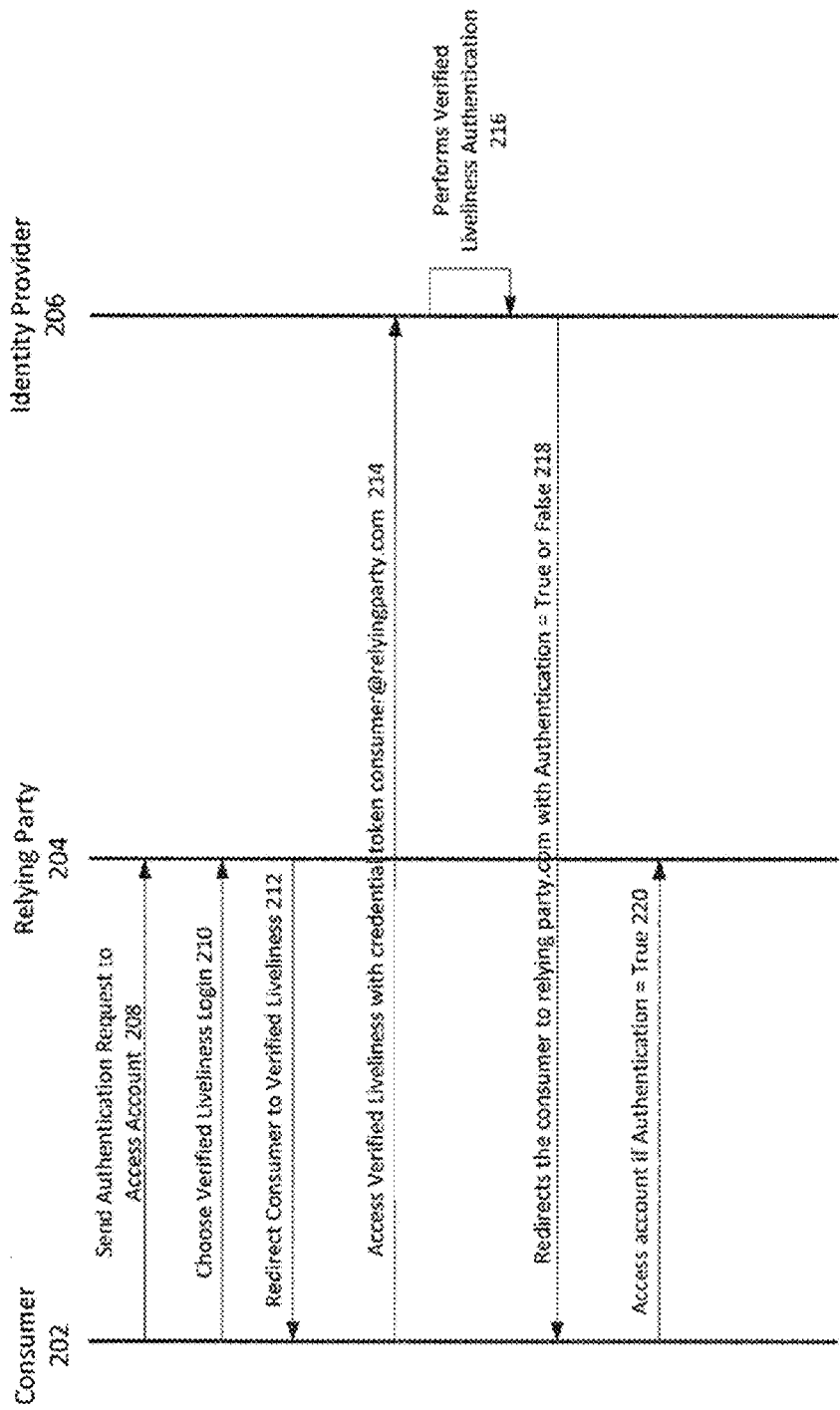
FIG. 2A is a timing diagram showing an example interaction among a consumer, a relying party, and an identity provider in authenticating the consumer when the consumer has enrolled at the identity provider according to some implementations.

With the above generalization, FIG. 2A is a timing diagram showing an example interaction among a consumer 202, a relying party (RP) 204, and an identity provider (IdP) 206 in authenticating the consumer when the consumer has enrolled at the identity provider 206 according to some implementations. The process may initiate with consumer 202 send an authentication request to access an account managed by relying party 204 (208). In some implementations, the submission of the authentication request may correspond to consumer 202 choosing biometric authentication 102 to access an account managed by, for example, a financial institution.

When the consumer submits the authentication request, the consumer may also choose a verified liveliness login for biometric authentication (210). The verified liveliness login, as disclosed herein, may address the liveliness of biometric data being submitted on-line, e.g., by verifying facial liveliness of the consumer when the consumer submits the biometric data.

For context, using a third-party intermediary to provide an authentication bridge way may be implemented in accordance with industry standards, for example, Security Assertion Markup Language (SAML) and Open standard for Authentication (OAuth).

SAML addresses web browser single sign-on (SSO). Single sign-on solutions may be implemented at the intranet level using, for example, cookies. Extending such single sign-on solutions beyond the intranet has been problematic and has led to the proliferation of non-interoperable proprietary technologies. In the use case addressed by SAML, the user (also known as the principal) may request a service from the relying party (also known as a service provider). The service provider then requests and obtains an identity assertion from the identity provider. On the basis of this identity assertion, the service provider can make an access control decision-deciding whether to perform some service for the connected principal.

In the case of OAuth (including more recent OAuth 2.0), the web application may specifically request a limited access OAuth Token (also known as the valet key) to access the Application Program Interfaces (APIs) on behalf of the user. The valet token may explicitly name the particular rights requested, and the user may not be required to enter a credential. If the user can grant that access, the web application can retrieve the unique identifier for establishing the profile (identity) using the APIs.

Hence, authentication standards may generally provide a single sign-on so that a consumer can use, for example, the consumer's Facebook or Google login credentials to access other accounts (for example, an amazon account, a linked-in account, etc.), typically of the same consumer. Some authentication methodologies as disclosed herein may provide a single authentication proof of identity by using biometric data, for example, using facial biometric.

Referring to FIG. 2A, in response to receiving the consumer choice of verified liveliness login, a server at the relying party may redirect consumer to proceed with verified liveliness (212). Thereafter, consumer 202 may be redirected to a server at the identity provider 206. For example, consumer 202 may submit a request to use verified liveliness by using a credential token in the form of consumer@relying_party.com (214). As illustrated in FIG. 2A, the request may be submitted at a server at identity provider 206.

Upon receiving the request to use verified liveliness, the server at identity provider 206 may perform verified liveliness authentication to verify the biometric submitted by the consumer (216). The verification may include that (i) the biometric submitted by the consumer provides affirmative proof of identity for the consumer; and (ii) the biometric submitted by the consumer on-line is fresh and live and not is being forged, for example, in a spoofing attempt.

As an initial matter, the server at identity provider 206 may retrieve, for example, a facial biometric from the data submitted by consumer 202. In some implementations, the retrieved facial biometric may be sent, from a computing device of consumer 202 to the server at identity provider 206, in an encrypted format based on an encryption algorithm. The computing device may include a video input component to provide a video stream feed. In some instances, the video input component includes a webcam. Images in the video feed may be captured at a frame rate of, for example, 24 frames per second. The frames generally are digitized for digital processing. In some instances, the images may be at a spatial resolution of, for example, 800×600 pixels, 1024×768 pixels, 1152×864 pixels, or 1280×1024 pixels. The computing device may include an imaging device (e.g., a camera device) that captures images of consumer 202. The captured images include facial biometric of consumer 202, and can be transmitted by the computing device to the server at identity provider 206.

In some implementations, the retrieved facial biometric is sent from a computing device associated with the relying party 204 or the identity provider 206. The computing device can internally include or be externally coupled to a camera device that is local to consumer 202 when consumer 202 is seeking authentication. For example, the camera device can be adjacent to an automatic teller machine (ATM) facing consumer 202 or within a registration office of a bank. The ATM or the office may be a property of the relying party 204 with whom consumer 202 seeks to perform a transaction. The camera device can capture images or a video feed that includes facial biometric of consumer 202 and transmit to the computing device. The computing device can process the captured images or video feeds and transmit the captured images or video feeds and/or the processed data to the server at identity provider 206.

The server at identity provider 206 may compare the retrieved facial biometric with biometric identity data of consumer 202. The biometric identity data of consumer 202 may be pre-stored at the server at identity provider 206. The comparison may be conducted in a manner consistent with the context-dependent rigidity requirement of the authentication. For example, if the amount in transaction is less than a particular threshold, such as $50, then the degree of matching between the facial biometric as submitted by consumer 202 on-line and the pre-stored facial biometric at the server at the identity provider 206 may be reduced. On the other hand, however, the if amount in transaction is higher than a particular threshold, such as, for example, $1,000, then the degree of matching between the facial biometric as submitted by consumer 202 on-line and the pre-stored facial biometric at the server at the identity provider 205 may be heightened. In a related example, if the transaction is in the nature of a mortgage application, a credit card application, the degree of matching may also be heightened. A scoring mechanism may be implemented to generate a score to quantify the degree of resemblance between the facial biometric as submitted by consumer 202 on-line and the pre-stored facial biometric at the server of identity provider 206. The score of resemblance may be used by the server at identity provider 206 to determine whether the retrieved facial biometric as submitted by consumer 202 on-line is sufficient to prove that the submitting consumer 202 is the person whose biometric data is stored at the server of identity provider 206.

Further, the server at identity provider 206 may determine whether the retrieved facial biometric being submitted by consumer 202 on-line is a live facial biometric. One risk associated with on-line authentication has been the prospect of a man-in-the-middle attack. For example, during spoofing, a third party may impersonate consumer 202 by replaying an authentication proof as submitted by consumer 202 earlier and was obtained by the third party. Some encryption mechanism may counter the man-in-the-middle threat by refreshing or updating the encryption key used to encrypt the stream of communication sessions between consumer 202 and identity provider 206. Generally, however, such encryption mechanism may not address the staleness of the biometric data itself. In other words, some encryption mechanism may be inadequate if a third party obtains an instance of the biometric data and attempts to replay the instance of biometric data to gain access to the account of consumer 202. Such risks may be amplified with the combination of username and password login because the text strings for username and password may not be refreshed at the granularity of each login session. Specifically, refreshing username and password for each login session (or at a sub-session level at, for example, every few seconds) may not be practical.

Some implementations as disclosed herein may verify the liveliness of the biometric data as submitted by consumer 202, for example, by performing verification of facial liveliness of consumer 202. In some implementations, the server at identity provider 206 performs liveliness verification based on the submitted images or video feeds. In some implementations, a computing device associated with consumer 202 performs liveliness verification based on the captured images or video feeds and submits a result of liveliness verification to the server at identity provider 206, e.g., in an authentication request including the biometric data of consumer 202. The server at identity provider 206 can then seamlessly determine that the biometric data submitted by consumer 202 is live. In some implementations, a computing device associated with relying party 204 or identity provider 206 that obtains images or video feeds from a camera device local to consumer 202, performs liveliness verification based on the captured images or video feeds and submits a result of liveliness verification to the server at identity provider 206.

Figures 3A, 3B:
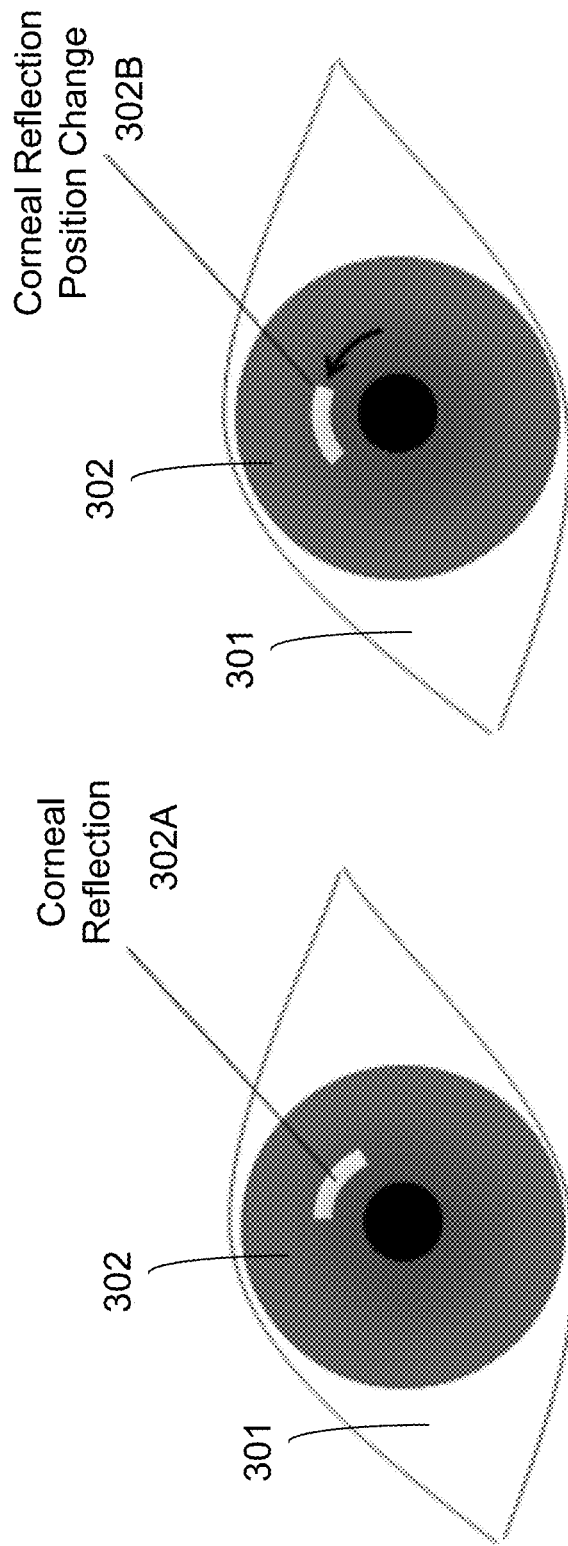
FIGS. 3A and 3B illustrate the changed positions of the corneal reflection of an object.

In some implementations, liveliness verification may include analysis of a corneal reflection from consumer 202. Initially, the face of consumer 202 may be detected. Referring to FIGS. 3A and 3B, the eye 301 of consumer 202 may then be detected in a video feed or images. Generally, such detections include segmentation techniques that leverage face or eye template data. Such template data may be morphed through various shape transforms to identify face or eye area in the video feed or images. Once eye 301 is detected, cornea region 302 may then be determined in the video feed or images. Reflections of the corneal region in the video frames or images may then be analyzed.

First, an object at the location of consumer 202 may cause corneal reflection from consumer 202. Here, the object may include an illumination source such as a light source, a camera device such as a webcam, or a device or subject (e.g., a window or a table) brighter than the ambient environment. In some examples, the object is a camera in a mobile device of consumer 202. Consumer 202 uses the camera to capture facial images or biometric of consumer 202. In some examples, the object may be in a place local to consumer 202. The place may be associated with relying party 204 with whom consumer 202 seeks to perform a transaction. For example, the place includes an automatic teller machine (ATM) facing consumer 202. The object can be mounted adjacent to the ATM. In some instances, the object may be fixed or positioned to the locale where consumer 202 is seeking authentication. Generally, the object is readily visible under normal illumination condition and can cause specular reflections from consumer 202 on-site. The specular reflection off the cornea of consumer 202 may be leveraged to determine liveliness of the authentication.

In some implementations, if the object has moved, the specular reflections of such object in the corneal of consumer 202 are expected to move accordingly. If the specular reflection of such object moves in concert with the movement of the object on-site, then consumer 202 can be authenticated as live. In some cases, the movement of the object is performed by consumer 202. For example, consumer 202 is prompted to move a mobile phone including a camera device, and the corneal reflection of the camera device is moved accordingly. The movement of the camera device on-site can be measured by an on-board accelerometer or gyroscope in the mobile device. In some cases, the object is moved in a manner unpredictable by consumer 202 (or would-be hackers as man in the middle).

For example, the object can be moved from position 1 to position 2. When the object is at position 1, a first image is captured. The location, shape, and color/wavelength of the reflected object may be detected by analyzing the corneal reflections in the captured first image. The detection can leverage segmentation techniques to automatically zero in on the corneal reflection 302A of the object. Thereafter, when the object is moved to position 2, a second image is captured. The location, shape, and color/wavelength of the reflected object may be detected anew as corneal reflection 302B by analyzing the captured second image. In some cases, the trajectory of the motion of object may be tracked by monitoring the reflected object. As illustrated, changes in the location of the detected object in corneal reflections 302A and 302B may be compared to the changes of object locations, e.g., programmed or measured location changes of the object. By way of illustration, some implementations may register the position of the reflected object relative to reflections of other structures adjacent to consumer 202 in a room or in front of an ATM where consumer 202 is seeking authentication. Some implementations may register the position of the reflected object relation to other bodily structures in or around the eye of consumer 202.

Figure 4:
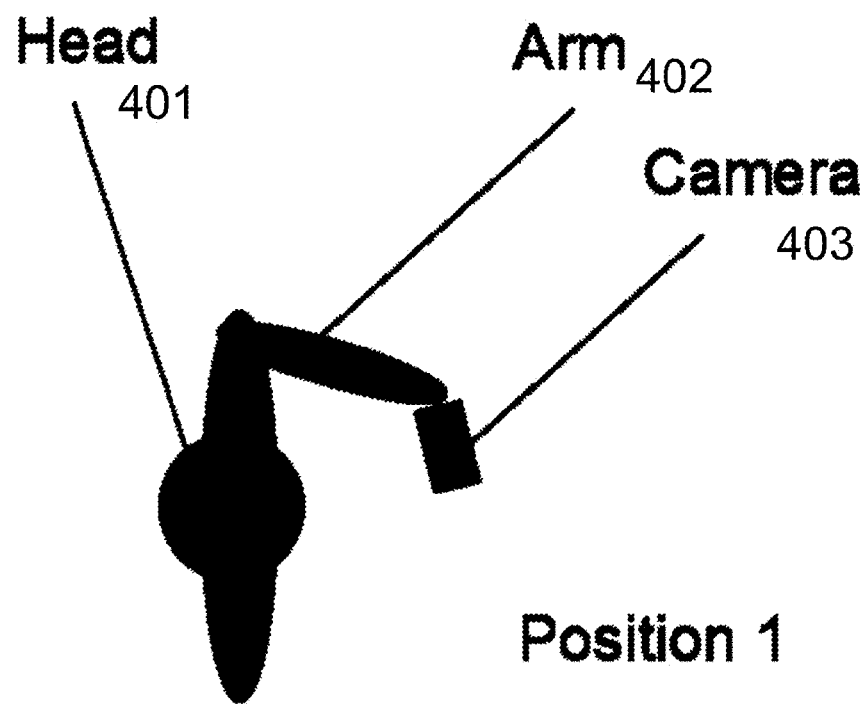
FIG. 4 illustrates an object that has changed position by virtue of arm adjustments.
Figure 4:
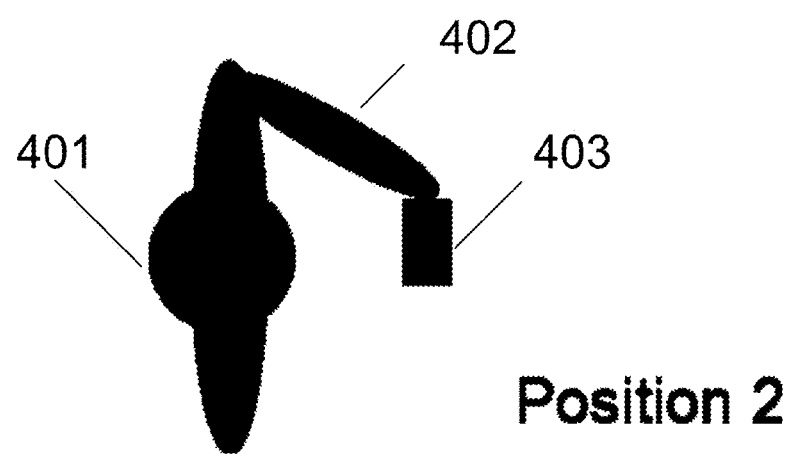

FIG. 4 illustrates an example object camera 403 that has been changed position by virtue of arm adjustments of consumer 202. Camera 403 is held on arm 402 of consumer 202, and faces head 401 of consumer 202. In position 1, arm 402 is more extended, for example, to be closer to the face of consumer 202. In position 2, arm 402 is more recoiled, for example, to move further away from the face of consumer 202. Such positional changes of camera 403 are expected to cause changes in the reflected camera from cornea of consumer 202. In some examples, the object may rely on a mechanism that leads a changed position of the object. The mechanism can be pan, zoom, tilt (PZT), or any other suitable mechanism.

Motions of an object can cause more interesting changed location and shape of the reflected object in corneal reflections. The object may be programmed to move by virtue of a controller such as on-board accelerometer or gyro motors. In some cases, the object is moved in a predetermined (or preprogrammed) motion. The predetermined motion can be previously embedded in the object. The predetermined motion can be also transmitted to the controller, e.g., from the server at identity provider 206 or a computing device coupled to the controller. Each time the predetermined motion can be different from previous predetermined motions. In some cases, the object is moved randomly. The actual movement of the object can be measured or detected by sensors such as on-board accelerometer or gyro motors.

The changes of the object may not be limited to mere positional changes manifested as translational or rotational adjustments. The variety of such changes in position and change can be leveraged to provide an enriched analysis of corneal reflections. In one example, the object can even change to a position to cause the wavelength of corneal reflection to change. By way of illustration, the object can be translated to deflect illumination from a different illumination source facing consumer 202, e.g., a flashlight of a mobile device of consumer 202.

Notably, even though the head or face of consumer 202 may or may not move, the object moves, in a pattern known to the identity provider but unknown to consumer 202 (or would-be hackers as man in the middle) beforehand, to cause changes in cornea reflection of the object. In some cases, the object can be moved from a first position to a second position in relatively fast speed compared to the movement of the head or face of consumer 202, such that the movement of the head or face of consumer 202 can be considered as relatively static. A camera device can capture a first facial image of consumer 202 when the object is at the first position at a first time point and capture a second facial image of consumer 202 when the object is at the second position at a second time point. An interval between the first and second time points can be short, e.g., less than 1 second.

In some cases, the movement of the head or face of consumer 202 can be leveraged by analysis of movement of static or unmoved subjects (e.g., a window or a table adjacent to consumer 202) in the captured images. If consumer 202 is prompted to move the object, consumer 202 can be notified not to move the head or face of consumer 202.

A camera device is configured to capture the images and/or video feeds of consumer 202. The camera device can be positioned facing a face of consumer 202. In some examples, the camera device can be internally included in a mobile device of consumer 202. Consumer 202 can hold the mobile device such that the camera device faces the face of consumer 202 to capture facial images. The camera device can be positioned such that the camera device is at a tilted angle to the eye of consumer 202 or opposite to the eye of consumer 202. In some examples, consumer 202 is seeking authentication before an ATM. The camera device can be fixed on the ATM or adjacent to the ATM.

The camera device can capture the images and/or video feeds for verifying facial liveliness of consumer 202, e.g., without interaction with consumer 202 or without notice to consumer 202. In some cases, the movement of the camera device can be associated with a natural motion of consumer 202. A sensor, e.g., an accelerometer, a gyroscope, or a global positioning system (GPS) on a mobile device including the camera device, can measure the movement of the camera device. The mobile device can determine that the camera device is moving by using the sensor and then transmit a request to the camera device to capture facial images of consumer 202.

In some implementations, upon receiving the request to use verified liveliness, the server at identity provider 206 may transmit a request to the camera device, e.g., directly or through a computing device coupled to camera device and in communication with the server. In response to the request, the camera device can automatically capture facial images of consumer 202 when the object is moved between positions. The object can be moved based on the request. For example, a computing device in communication with the server receives the request and transmits a command to a controller of the object for moving the object. The object can be moved between positions in synchronization with the camera device capturing facial images of consumer 202.

The movement of the object can be associated with respective time points. For example, at a first time point, the object is at a first position; at a second time point, the object is moved to a second position. The camera device can capture facial images or video feeds of consumer 202 during the movement of the object and/or before and after the movement of the object. The captured facial images are also associated with respective time points. The time points can have a high accuracy, e.g., less than 1 millisecond. For example, the camera device captures a first facial image when the object is at the first position at the first time point, and a second facial image when the object is at the second position at the second time point. Based on the time points, the captured facial images of consumer 202 can be associated with the positions of the object. Thus, the corneal reflection of the object in the captured images or video feeds can be associated with the movement of the object, which can be used to verify facial liveliness of consumer 202.

The camera device can also capture images and/or video feeds of consumer 202 that include biometric data submitted by consumer 202 to the server at identity provider 206 for authentication, e.g., by interacting with consumer 202 to obtain the biometric data. In some cases, an additional imaging device or a video input component is used to capture images and/or video feeds that include biometric data of consumer 202 for authentication.

In some implementations, the object is the camera device. As noted above, the camera device can be moved by consumer 202 or by a mechanism in a controlled manner or randomly. The motion (and/or orientation and/or relative position) of the camera device can be measured, e.g., by on-board accelerometer or gyroscope. For verification of facial liveliness of consumer 202, the detected position changes in the corneal reflections of the camera device may be correlated to the predetermined or measured motion of the camera device.

In some implementations, the object is a static subject adjacent to consumer 202, e.g., a door behind consumer 202 or a window besides consumer 202. The camera device is moved between positions and captures facial images of consumer 202 at these positions. The facial images include corneal reflections of the object. For verification of facial liveliness of consumer 202, the detected position changes in the corneal reflections of the object may be correlated to a predetermined or measured motion of the camera device.

In some implementations, the object is a subject configured to be moved between positions in a motion for liveliness verification, while the camera device is static and captures facial images of consumer 202 when the object is at different positions. The facial images include corneal reflections of the object. For verification of facial liveliness of consumer 202, the detected position changes in the corneal reflections of the object may be correlated to a predetermined or measured motion of the object.

In some implementations, the object is a subject configured to be moved between positions in a first motion pattern, while the camera device is also moved between positions in a second motion pattern. Moving both the object and the camera device for liveliness verification can increase security against hackers. The camera device captures facial images of consumer 202 when the object is at different positions and the camera device is also at different positions. The facial images include corneal reflections of the object. For verification of facial liveliness of consumer 202, the detected position changes in the corneal reflections of the object may be correlated to a motion pattern based on the first motion pattern (predetermined or measured) of the object and the second motion pattern (predetermined or measured) of the camera device. The motion pattern can be a relative motion pattern for the object and the camera device.

In some implementations, the object is static, and the camera device is also static. An illumination on the object from an illuminator can change at different time points, e.g., changing illumination colors or patterns, and the corneal reflection of the object can change correspondingly. For verification of facial liveliness of consumer 202, the detected illumination change on the object in the corneal reflections of the object may be correlated to a known illumination change of the illuminator.

In some implementations, the object is an illuminator, e.g., a light source and/or a digital illumination source displayed on a screen, e.g., a liquid crystal display (LCD) of a mobile device. The camera device can capture facial images of consumer 202 that include corneal reflections of the object. For verification of facial liveliness of consumer 202, the detected illuminator in the corneal reflections of the object may be correlated to a predetermined or measured illumination change of the illuminator.

In some implementations, the camera device is static and/or the object is also static. A computing device coupled to the camera device can prompt consumer 202 to move the head or the face in a motion pattern, e.g., turning from left to right. The camera device can capture facial images of consumer 202 during the movement of consumer 202. For verification of facial liveliness of consumer 202, the detected position changes in the corneal reflections of the object may be correlated to a motion of consumer 202.

In some implementations, the object and/or the camera device can be moved in a motion pattern, and an illumination on the object can also change at different time points, e.g., changing illumination colors or patterns. Verification of facial liveliness of consumer 202 can be based on: 1) the correlation between the detected position changes in the corneal reflections of the object and the motion pattern of the object and/or the camera device, and 2) the correlation between the detected illumination change on the object in the corneal reflections of the object and the predetermined or measured illumination change.

Initially, the images during the movement of the object and/or the camera device may be captured in a video stream at a full frame rate (for example, as determined by Nation Television System Committee—NTSC, or as determined by the video communication standard H.261). In some implementations, for efficiency of communication, only a portion of the captured video stream may be transmitted, for example, in accordance with adaptive video codec specification of H.261. When changes in corneal reflections are about to initiate, the video feed may be digitalized and transmitted to the server at identity provider 206 at a rate faster than a floor-level rate (when consumer 202 remains stationary). In some examples, the video feed or images are transmitted to the server at identity provider 206 by the camera device. In some examples, a computing device coupled to the camera device receives the images or video feed from the camera device and transmits the images or video feed to the server at identity provider 206.

As noted above, the server at identity provider 206 can perform liveliness verification based on the transmitted images or video feed. The server can analyze the images or video feed to determine corneal reflections of the object. Based on the determined corneal reflections, the server can determine a position change in the corneal reflections of the object. The server can compare the position change in the corneal reflections of the object to a motion pattern and determine facial liveliness of consumer 202 based on a result of the comparison. In some examples, the motion pattern is a predetermined motion pattern of the object or the camera device or both when moved between positions. The server can pre-store the predetermined motion pattern. In some examples, the motion pattern is a measured motion pattern of the object or the camera device or both when moved between positions. The motion pattern can be transmitted to the server together with the captured images or video feed. In some examples, the server at identity provider 206 can analyze the received images and/or video feeds to determine the motion pattern, e.g., by analyzing a position change of a static subject in the captured images and/or video feeds.

In some implementations, a computing device coupled to the camera device performs liveliness verification based on the captured images or video feeds and submits a result of liveliness verification to the server at identity provider 206, e.g., with or without transmitting the captured images or video feeds. In some cases, the computing device receives biometric data of consumer 202 for authentication and transmits the result of liveliness verification together with the biometric data of consumer 202 to the server at identity provider 206.

In some examples, the computing device is associated with relying party 204 or identity provider 206. For example, consumer 202 is seeking authentication using an ATM associated with relying party 204. The computing device can be local to the ATM and coupled to the camera device that faces consumer 202. The computing device can receive from the server at identity provider 206 a request to verify liveliness of consumer 202. In response to the request, the computing device can transmit commands to the camera device and/or the object to ask the camera device to capture images and/or video feeds when the camera device and/or the object is moved between positions in a motion pattern, e.g., unknown to consumer 202 and without input from consumer 202. In some cases, the computing device predetermines the motion pattern and transmits the motion pattern to the camera device and/or the object. The computing device can change the motion pattern each time when performing liveliness verification. In some cases, the motion pattern is a preprogrammed or predetermined motion pattern. The computing device can pre-store the motion pattern. In some cases, the motion pattern is measured by sensors when the camera device and/or the object is moved with positions. The computing device can receive the measured motion pattern from the sensors.

In some examples, the computing device is associated with consumer 202, e.g., a smartphone or a computer. For example, consumer 202 is seeking authentication at home. The computing device can internally include a camera device or externally be coupled to a camera device. In some cases, an application (or an App when the computing device is a smartphone) provided by identity provider 204 in installed in the computing device. Upon receiving a request from the server at identity provider 204 or determining consumer 202 chooses to use liveliness verification for biometric authentication, the application can solicit consumer 202 to move the camera device in relative to the face of consumer 202. By using a sensor (e.g., an accelerometer or gyroscope, the computing device can determine a movement of the camera device. In some examples, the computing device can analyze the captured images and/or video feeds to determine the motion of the camera device, e.g., by analyzing a position change of a static subject in the captured images and/or video feeds. The images of the static subject can be corneal reflections or outside of the corneal area. The computing device can perform liveliness verification based on the motion pattern and the corneal reflections of the camera device in captured images and/or video feeds. In some cases, the application in the computing device controls an illumination source such as a flashlight of the camera device to change illumination color or pattern unknown to consumer 202. The application can perform liveliness verification based on the changed color or pattern of the illumination source and the corneal reflections of the camera device in captured images and/or video feeds.

Similar to facial authentication, a scoring mechanism may be implemented to quantify the degree of match between the response corneal reflection of the object and the expected change (e.g., a motion pattern or an illumination change). The scoring mechanism may generate a numerical value as a measure for determining liveliness of the face of consumer 202. The degree of match may depend on the context and hence can vary from application to application. For example, the degree of match may depend on the nature of the underlying transaction or the dollar amount involved in the underlying transaction.

In some implementations, corneal reflections of the object in sequential facial images of consumer 202 are detected. The sequential facial images are captured at sequential time points by a camera device. An expected corneal reflection of the object at a particular time point can be determined based on a determined corneal reflection in a previous time point and a motion between the previous time point and the particular time point. The facial liveliness of consumer 202 can be assessed by determining likelihood between the expected corneal reflection and the determined corneal reflection from the captured facial images at the particular time point.

Corneal reflection may proffer benefits as non-intrusive and capable of handling a wide band of operations (for example, from infra-red to visible light). Particularly, corneal reflection tends to be more specular than skin reflections, which tend to be more scattered. Implementations disclosed herein may not include verbal directives to prompt consumer 202 to change facial gestures or other bodily positions.

Further, pose of the face of consumer 202 may be estimated, for example, using an automatic algorithm. The automatic algorithm can detect the pose of the face relative to the camera device in each capture image, e.g., from a video feed. Additionally, an expected pose or change in pose of a face may be calculated based on the measured or known positions of the camera device, e.g., by on-board accelerometer or gyro motors or from analyzing the corneal reflections of the camera device. In some implementations, consumer 202 is prompted to move the camera device in relative to the face of consumer 202. Such calculation can be performed for each additional image captured from the video feed. More interesting, the expected pose or changes in pose, as calculated from the measured locations of the camera device and the detected pose of the face in the capture image may be correlated in a quantitative manner using a scoring mechanism. The numerical value as determined from the correlation can be used to gauge the liveliness of the face.

In some implementations, pose of the face of consumer 202 is detected or estimated by analyzing one or more facial landmarks of consumer 202. The facial landmark features can include the nose, the forehead, the eye brows, the eyes, the eye corners, the lips, and/or the mouths. Poses of the face or facial portraits from a live session reflect the face of the subject at various angles. Due to slight changes in viewing angles of the pose or facial portrait, the apparent orientation and size of each facial landmark varies. Orientation and size of one or more facial landmark features can be expected to vary. Each landmark feature may be associated with one commensurate change in orientation and size. The threshold of expected change may be a combination of all expected changes for the landmark features. As noted above, the threshold may be application-specific. For example, for transaction involving dollar amounts under a particular level, the comparison may be less sophisticated in order to determine that the session is live and the submitted facial biometric is genuine. Otherwise, when the transaction involves a paramount identification document, for example, renewal of passport, the comparison may involve a more comprehensively determined threshold.

In some implementations, verification of facial liveliness of consumer 202 is based on both the corneal reflection of the object and the pose change of the face. A scoring mechanism may be implemented to quantify the degree of match between the response corneal reflection of the object and the known motion pattern to determine a first numerical value. The scorning mechanism can be also implemented to quantify the degree of match between the expected pose or changes in pose (e.g., calculated from the measured locations of the camera device) and the detected pose in a capture image to determine a second numerical value. Then an overall score can be determined based on the first and second matching values, e.g., with a weighting factor. The weighting factors of the first and second matching values can be, for example, 50% and 50% or 60% and 40%. The additional verification may increase a confidence level that consumer 202 is indeed alive and is the person whose biometric is stored at the server of identity provider 206.

Some implementations may additionally include a biometric recognition feature to authenticate consumer 202. By way of example, server at identity provider 206 may conduct a facial recognition to compare the facial biometric of an enrolled consumer with the facial biometric of consumer 202 submitting the authentication request. If the comparison yields a matching result, the facial recognition may prove that consumer 202 is the person whose facial biometric is stored at the server at identity provider 206. In other examples, the biometric recognition may include voice recognition, speaker recognition, gait analysis, etc. Some implementations disclosed herein can detected liveliness seamlessly and without user awareness (e.g., directing the user to make any specific moves during the image capturing process). The stealth feature can be leveraged to further isolate liveliness detection from an on-line identity management session.

Referring back to FIG. 2A, after verifying that consumer 202 is alive and is the person whose biometric has been stored at identity provider, server at identity provider 206 may provide a signal that authentication is successful. If, however, consumer 202 cannot be verified as alive or as the person whose biometric has been stored at identity provider 206 in association with the account at relying party 204, server at identity provider 206 may provide a signal that authentication has failed. The signal may be embedded in a message to consumer 202 to redirect consumer 202 back to relying party 204 (218).

Consumer 202 may then return to the relying party 204 (220). If the embedded signal indicates that the verification is successful, consumer 202 may proceed to access the account at relying party 204. In returning to relying party 204, consumer 202 may attach a success signal backed up by a credential of identity provider 206. The credential of the identity provider 206 may include, for example, a digital private key of identity provider 206, a digital watermark of identity provider 206. If, however, the embedded signal indicates that the verification has failed, consumer 202 may not access the account at relying party 204. Moreover, consumer 202 may not even be redirected back to the relying party 204.

Figure 2B:
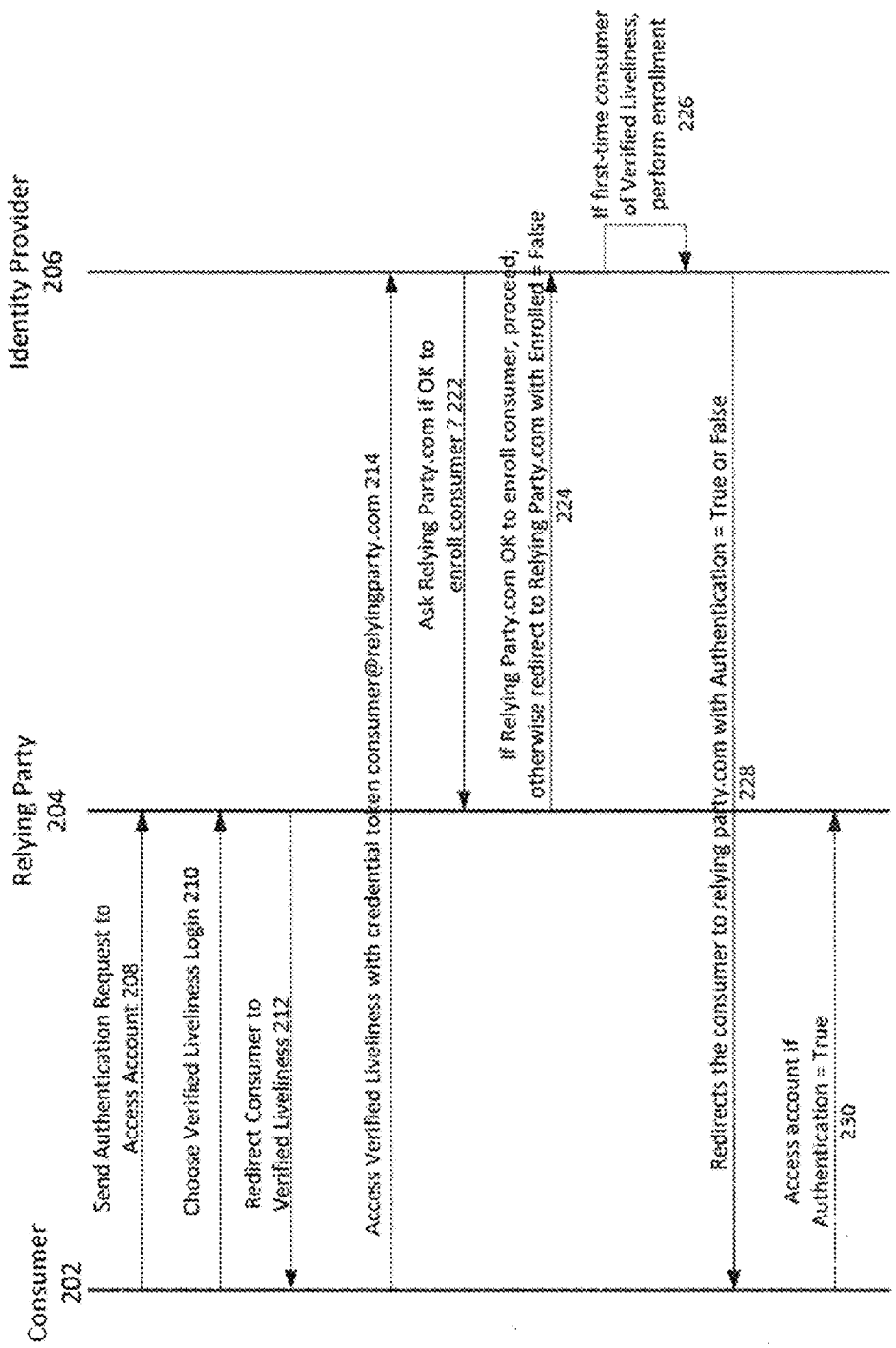
FIG. 2B is a timing diagram showing an example interaction among a consumer, a relying party, and an identity provider in authenticating the consumer when the consumer has not yet enrolled at the identity provider according to some implementations.

FIG. 2B is a timing diagram showing an example interaction among a consumer, a relying party, and an identity provider in authenticating the consumer when the consumer has not yet enrolled at the identity provider according to some implementations. As discussed above in association with FIG. 2A, the process may initiate with consumer 202 send an authentication request to access an account managed by relying party 204 (208). In some implementations, the submission of the authentication request may correspond to consumer 202 choosing biometric authentication 102 to access an account managed by, for example, a financial institution. When the consumer submits the authentication request, the consumer may also choose to a verified liveliness login for biometric authentication (210). In response to receiving the consumer choice of verified liveliness login, a server at the relying party may redirect consumer to proceed with verified liveliness (212). Thereafter, consumer 202 may be redirected to a server at the identity provider 206. For example, consumer 202 may submit a request to use verified liveliness by using a credential token in the form of consumer@relying_party.com (214). As illustrated in FIG. 2B, the request may be submitted at a server at identity provider 206.

The server at identity provider 206 may notice that consumer 202 has not yet registered for the verified liveliness service at identity provider 206. In response, the server at identity provider 206 may inquire the server at the relying party 204 whether the identity provider 206 may enroll consumer 202 in the verified liveliness service, as requested by consumer 202. Some relying parties may financially compensate identity provider 206 for the verified liveliness. In turn, these relying parties may stratify consumers into various classes with corresponding account benefits. By way of illustration, consumers with holdings above a threshold value of, for example, $50 k may have the verified liveliness service as a complimentary service. Consumers with less account value or shorter membership history may need to pay a fee to relying party 204 in order to have the verified liveliness service.

Upon determination that consumer 202 may enroll in the verified liveliness service, server at relying party 204 may indicate to the server at identity provider 206 that the enrollment for consumer 202 may proceed (224). If, however, server at relying party 204 determines that consumer 202 may not enroll in the verified liveliness service, server at relying party 204 may inform the server at identity provider 206 that consumer 202 does not have permission to enroll in the requested service and the server at identity provider 206 may drop the enrollment request initiated from consumer 202. Particularly, server at identity provider 206 may direct consumer 202 back to relying party 204 with the flag that enrollment has failed (224).

If the server at identity provider 206 receives confirmation that identity provider 206 may proceed with enrolling consumer 202, server at identity provider 206 may administer an enrollment procedure for consumer 202 (226). Specifically, identity provider 206 may request consumer 202 to register a biometric. The biometric may include, for example, a facial biometric, a finger-print, a palm-print, an iris scan, a retina scan. In the case of a facial biometric, server at identity provider 206 may request consumer 202 to pose in front of, for example, a web camera, a video camera, or a smart-phone camera. The camera device may reside on, for example, a computing device of consumer 202, or an ATM or in registration office of a bank. The camera device or a computing device coupled to the camera device may initially transmit a capture frame to server at identity provider 206. This captured frame may be stored at identity provider 206 as biometric information identifying consumer 202. By way of example, server at identity provider 206 or the computing device may verify the liveliness of the enrollment session as discussed above in association with FIGS. 2A, 3A, 3B and 4.

Consistent with the disclosure herein, server at identity provider 206 may also initiate illumination patterns on consumer 202 to increase the confidence level that a live consumer is attempting to enroll in the service. As discussed herein, multiple illumination patterns for different and separate spatial and temporal modulations may obviate the ambiguities associated with a single illumination response. For example, when consumer 202 may not be responding to the fullest extent as expected from one single illumination, or when sampling error during video transmission may have missed the frame that contains the exact response reflection, a single response illumination may be insufficient to determine with confidence that consumer 202 is a live person attempting to enroll in the service.

When consumer 202 has been determined as a live person and has been enrolled in the verified liveliness service, the server at identity provider 206 may redirect consumer 202 back to relying party 204 with a signal that the authentication is successful (228). If consumer 202 has been successfully enrolled in the program, the server at identity provider 206 may provide a signal that the authentication has succeeded. If, however, consumer 202 cannot be verified as alive or as the person and cannot be enrolled in the verified service program, the server at identity provider 206 may provide a signal that authentication has failed. The signal may be embedded in a message to consumer 202 to redirect consumer 202 back to relying party 204 (218).

Consumer 202 may then return to the relying party 204 (230). If the embedded signal indicates that the authentication has succeeded, consumer 202 may proceed to access the account at relying party 204. In returning to relying party 204, consumer 202 may attach a success signal backed up by a credential of identity provider 206. The credential of the identity provider 206 may include, for example, a digital private key of identity provider 206, a digital watermark of identity provider 206. If, however, the embedded signal indicates that the authentication has failed, consumer 202 may not access the account at relying party 204. Moreover, consumer 202 may not even be redirected back to the relying party 204.

Notably, in some implementations, a first-time enrollee may be sent to the server at identity party 206 after the first-time enrollee has successfully logged into an account of the first-time enrollee at the relying party 204. The enrollment may provide consumers with additional security features to guard against spoofing attacks. The security features may also include biometric recognition, as detailed above. In fact, some configurations may use the biometric recognition as a form of password authentication. In other words, the biometric recognition may be used as a surrogate for the password login.

In some implementations, however, identity provider 206 may obtain a database for a number of consumers attempting to enroll in a verified liveliness program. During the enrollment process, the server at identity provider 206 may collect a biometric from a consumer attempting to enroll. After verifying that the consumer is a live person making a legitimate enrollment request, the server at identity provider 206 may enroll the consumer. Hence, in some implementations, the server at identity provider 206 may have a copy of a digital biometric of consumer 202 when consumer 202 has been redirected from relying party 204. When a copy of the digital biometric of consumer 202 is available, the server at identity provider 206 may only need to determine that consumer 202 is a live person.

Implementations of the subject matter and the functional operations described in this specification can be implemented in digital electronic circuitry, in tangibly-implemented computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non transitory program carrier for execution by, or to control the operation of, data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including, by way of example, a programmable processor, a computer, or multiple processors or computers. The apparatus can also be or further include special purpose logic circuitry, e.g., a central processing unit (CPU), a FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example Linux, UNIX, Windows, Mac OS, Android, iOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a central processing unit (CPU), a FPGA (field programmable gate array), or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media (transitory or non-transitory, as appropriate) suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN), a wide area network (WAN), e.g., the Internet, and a wireless local area network (WLAN).

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combinations.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be helpful. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method for detecting facial liveliness, comprising:

processing, by one or more processors, first and second facial images of a subject to determine first and second corneal reflections of an object, the first and second facial images being captured at first and second sequential time points;

determining, by the one or more processors, a corneal reflection change of the object based on the determined first and second corneal reflections, wherein the corneal reflection change of the object includes a position change of the corneal refection of the object;

receiving information of a movement of the object associated with the first and second time points and measured by a sensor;

determining a motion based on the received information of the movement of the object, wherein the motion is associated with the movement of the object between first and second positions, and wherein the first facial image is captured at the first time point when the object is at the first position and the second facial image is captured at the second time point when the object is at the second position;

comparing, by the one or more processors, the determined corneal reflection change of the object to the motion associated with the first and second time points; and determining, by the one or more processors, facial liveliness of the subject based on a result of the comparison.

2. The method of claim 1, wherein comparing the determined corneal reflection change of the object to a motion comprises:

correlating the determined corneal reflection change of the object to the motion; scoring a matching quality based on a result of the correlation; and comparing the scored matching quality to a predetermined threshold, and wherein determining facial liveliness of the subject comprises:

determining that the face of the subject is live in response to determining that the scored matching quality is beyond the predetermined threshold.

3. The method of claim 1, further comprising:

determining an expected corneal reflection of the object at the second time point based on the determined first corneal reflection and the motion; and assessing the facial liveliness of the subject by determining likelihood between the expected corneal reflection and the determined second corneal reflection.

4. The method of claim 1, further comprising:

prompting the subject to move the object.

5. The method of claim 1, wherein the movement of the object is associated with a natural motion of the subject.

6. The method of claim 1, wherein the one or more processors are included in a computing device, and wherein the computing device includes the object and the sensor, and the object is a camera device and the sensor includes at least one of an accelerometer, a gyroscope, or a global positioning system (GPS).

7. The method of claim 6, further comprising:

determining, by using the sensor, that the object is moving; and requesting the camera device to capture facial images of the subject.

8. The method of claim 1, wherein the motion is a predetermined motion for the object, and wherein the object is moved from the first position to the second position based on the predetermined motion.

9. The method of claim 1, wherein the first and second facial images include a second object that is static during the movement of the object, and
wherein the method further comprises determining the motion based on a position change of the second object in the first and second facial images.

10. The method of claim 1, further comprising:
transmitting a command to a controller coupled to the object, the command indicating the controller to move the object.

11. The method of claim 10, wherein the command comprises a predetermined motion for the object, and wherein the predetermined motion is different from a previous predetermined motion for the object.

12. The method of claim 1, further comprising:
transmitting a command to a camera device to capture facial images of the subject at sequential time points including the first and second time points; and
receiving the captured facial images from the camera device.

13. The method of claim 12, wherein receiving the captured facial images from the camera device comprises receiving a video stream feed from the camera device, the video stream feed comprising the captured facial images.

14. The method of claim 1, wherein the object includes one of a camera device, an illumination device, or an object brighter than ambient environment.

15. The method of claim 1, further comprising:
determining that the subject chooses to use liveliness verification for biometric authentication.

16. The method of claim 15, further comprising:
transmitting, to a computing device at an identity provider, an authentication request of the subject for accessing an account managed by a relying party different from the identity provider, the authentication request including biometric data of the subject and the determined facial liveliness of the subject.

17. A computer-implemented method for detecting facial liveliness, comprising:
transmitting, by one or more processors, a command to a camera device to capture facial images of a subject at sequential time points including first and second sequential time points;
receiving, by the one or more processors, the captured facial images from the camera device;
processing, by the one or more processors, first and second facial images of the subject in the captured facial images to determine first and second corneal reflections of an object, the first and second facial images being captured at the first and second sequential time points;
determining, by the one or more processors, a corneal reflection change of the object based on the determined first and second corneal reflections, wherein the corneal reflection change of the object includes a position change of the corneal refection of the object;
comparing, by the one or more processors, the determined corneal reflection change of the object to a motion associated with the first and second time points; and
determining, by the one or more processors, facial liveliness of the subject based on a result of the comparison,
wherein the camera device is moved from a first position to a second position between the first and second time points,
wherein the first facial image of the subject is captured at the first time point when the camera device is at the first position, and the second facial image of the subject is captured at the second time point when the camera device is at the second position, and
wherein the motion is based on a movement of the camera device between the first and second positions.

18. The method of claim 17, further comprising:
transmitting a second command to a controller coupled to the object, the second command indicating the controller to move the object at the first and second time points,
wherein the motion is based on the movement of the camera device and the movement of the object.

19. A computer-implemented method for detecting facial liveliness, comprising:
processing, by one or more processors, first and second facial images of a subject to determine first and second corneal reflections of an object, the first and second facial images being captured at first and second sequential time points;
determining, by the one or more processors, a corneal reflection change of the object based on the determined first and second corneal reflections, wherein the corneal reflection change of the object includes a first illumination change on the object in the first and second corneal reflections;
comparing, by the one or more processors, the determined corneal reflection change of the object to a motion associated with the first and second time points;
obtaining a second illumination change on the object for the first and second time points;
determining a matching quality between the obtained second illumination change on the object and the first illumination change in the first and second corneal reflections; and
determining facial liveliness of the subject based on the determined matching quality and the result of the comparison.

20. A computer-implemented method for detecting facial liveliness, comprising:
processing, by one or more processors, first and second facial images of a subject to determine first and second corneal reflections of an object, the first and second facial images being captured at first and second sequential time points;
determining, by the one or more processors, a corneal reflection change of the object based on the determined first and second corneal reflections, wherein the corneal reflection change of the object includes a position change of the corneal refection of the object, wherein the first facial image is captured at the first time point when the object is at a first position and the second facial image is captured at the second time point when the object is at a second position, and wherein the first and second facial images include a second object that is static during a movement of the object between the first position and the second position;
determining a motion based on a position change of the second object in the first and second facial images;
comparing, by the one or more processors, the determined corneal reflection change of the object to the determined motion; and
determining, by the one or more processors, facial liveliness of the subject based on a result of the comparison.

* * * * *